United States Patent [19]
Staszewski et al.

[11] Patent Number: 5,987,038
[45] Date of Patent: Nov. 16, 1999

[54] SYNC DETECT CIRCUIT

[75] Inventors: Bogdan Staszewski; Sami Kiriaki, both of Garland, Tex.

[73] Assignee: Texas Instruments Incorporated, Dallas, Tex.

[21] Appl. No.: 08/985,038

[22] Filed: Dec. 4, 1997

Related U.S. Application Data

[60] Provisional application No. 60/034,348, Dec. 23, 1996.
[51] Int. Cl.[6] ................................................. G05B 19/02
[52] U.S. Cl. ........................................ 370/514; 340/225.36
[58] Field of Search ..................................... 370/514, 503, 370/509–512, 452; 381/7.14; 340/825.36, 825.52, 825.26

[56] References Cited

U.S. PATENT DOCUMENTS

| | | | |
|---|---|---|---|
| 3,689,872 | 9/1972 | Sieracki | 340/825.26 |
| 3,925,763 | 12/1975 | Wadhwani | 340/825.36 |
| 4,042,783 | 8/1977 | Gindi | 370/453 |
| 4,227,178 | 10/1980 | Gergaud et al. | 340/825.52 |
| 5,054,070 | 10/1991 | Eckstein et al. | 381/7 |

*Primary Examiner*—Thien Minh Le
*Attorney, Agent, or Firm*—W. Daniel Swayze, Jr.; Wade James Brady, III; Richard L. Donaldson

[57] ABSTRACT

A sync detect circuit is comprised of two serial data registers (40) and (42), each for storing a single word. A plurality of current sources in current source banks (44) and (46) are operable to convert the bits in the stored sync word to a differential current domain. Depending upon the logic state, the currents are added on two lines (50) and (52). When the differential current falls below a predetermined limit, a frame sync signal is generated to latch the next and following words into a data latch (34). These are then transferred out to a system upon the generation of a system data clock.

11 Claims, 3 Drawing Sheets

SYNC DETECT CIRCUIT

This appln claims the benefit of U.S. Provisional Appln No. 60/034,348, filed Dec. 23, 1996.

TECHNICAL FIELD OF THE INVENTION

The present invention pertains in general to a sync detect circuit for detecting the presence of sync bits in a serial data stream and, more particularly, to a sync detect circuit for operating in the current domain.

BACKGROUND OF THE INVENTION

Serial data streams are typically transmitted over a single wire data bus. For a synchronous transmission, the first step required is extraction of a bit clock therefrom. In some systems, the bit clock itself is transmitted over a separate line or bus, such that the data reception is synchronized with respect to each clock edge associated with a bit. However, most data is transmitted in groups of bits, each group of bits constituting a single data word. Typically, a data word is eight bits long, which constitutes a byte, or nine bits long to accommodate some line coding or error correction overhead. Although the data is received in a synchronous manner, such that each bit can be recognized, it is still difficult to determine the byte boundary or frame boundary. This would require a separate frame clock.

In data storage devices, such as magnetic hard disks or CD ROMs, data must be extracted from the media, which is typically a mechanical spinning media, in a synchronous fashion. The method typically utilized to synchronize the overall operation of the system is to store at least one byte of synchronizing data at the beginning of each sector in the disk such that the serial data can be loaded into a serial shift register and the contents of that serial register compared in a parallel manner to a known sync word. When the data in the serial register matches the sync word, then this constitutes reception of the sync word and a frame boundary is defined.

One disadvantage to previous systems for detecting the presence of the sync words is that they required a template matching technique wherein a plurality of exclusive OR gates were required to make a comparison between each bit in the serial register and each bit of the sync word. This required a significant amount of circuitry to accomplish this decoding function.

SUMMARY OF THE INVENTION

The present invention disclosed and claimed herein comprises a sync detect circuit for detecting the presence of a series of sync bits in a predetermined order of n data bits in length in a serial data stream and clocked with a bit clock. The sync detect circuit includes a serial data register for receiving the data bits from the serial data stream and having a length of at least n. The serial data register is clocked by the bit clock. A parallel current domain converter is provided for converting pattern matching of each of the n sequential bits into the current domain such that a discrete current value is output for each of the n bits in the serial data register. The value of each of the discrete currents corresponds to the digital value of mismatch of the associated serial bit. A summing circuit (electrical node) is provided for summing the discrete current values associated with all of the converted n bits stored in the serial data register to provide a summed value. A comparator then compares the summed value with a reference sum value. A sync detect signal generator then generates the sync detect signal when the comparator provides a threshold comparison of the summed value with the reference sum value.

In another aspect of the present invention, the parallel current domain converter is operable to convert each of the n sequential bits stored in the serial data register into a differential current domain. The parallel current domain converter is comprised of a first and second differential nodes associated with a plurality of first switchable current sources and a plurality of second switchable current sources, respectively. Each of the first current sources is associated with one of the n sequential bits in the serial data register and switchable when the associated one of the n bits is at a matched logic state to switch current to the first differential node. Each of the second current sources is associated with one of the n sequential bits in the serial data register and switchable when the associated one of the n bits is at a second logic state opposite the first logic state and is operable to switch current to the second differential node. The summing circuit comprises the first and second differential nodes which are operable to sum the switched current thereto by the first and second current sources, respectively. This difference between these two sums is compared with a predetermined reference and, when it is less than this reference, the sync detect signal is generated.

In a further aspect of the present invention, a frame boundary detect circuit is provided for generating a frame sync signal upon generation of the frame found signal. The frame sync signal therefore indicates the presence of a frame boundary associated with the beginning of a data word that is to be received in the next sequential number of bits received in the serial data register. In this operation, the n sequential bits converted by the parallel current domain converter are the last received n serial bits. A parallel data register is provided for receiving the output of the first m bits of the serial data register, m being the length of the data word in the serial data string. The parallel register is loaded by the frame sync signal.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
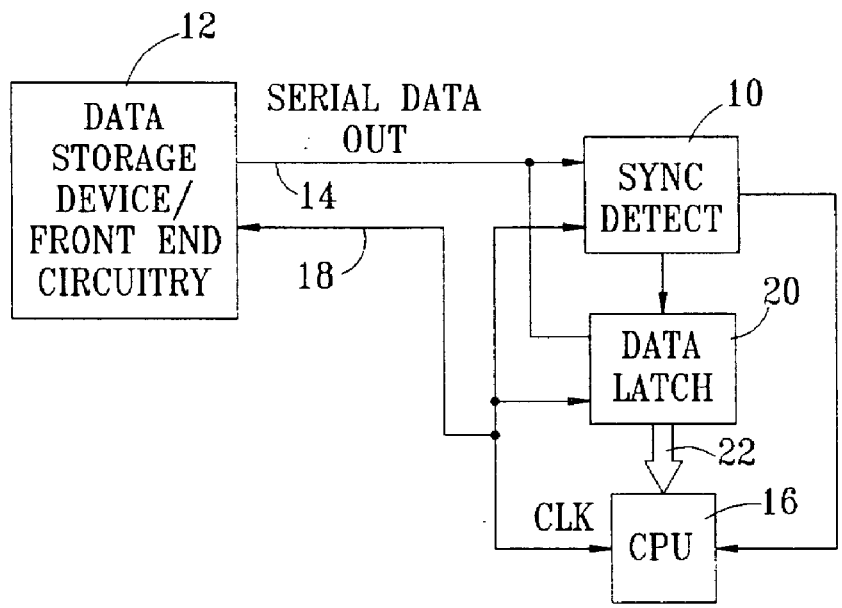
FIG. 1 illustrates a block diagram of a system utilizing the sync detect circuit of the present invention.

Referring now to FIG. 1, there is illustrated a block diagram depicting a sync detect circuit 10 utilized in conjunction with a data storage device 12 such as a hard disk drive and front end circuitry, which front end drive circuitry is operable to recover the bit clock from the data storage media. The data storage device 12 is operable to output a serial data stream on a serial data output line 14 and also provide a bit clock output on a line 18. The serial data is in a format such that it is synchronized with the sync detect circuit 10 in that they share a similar bit clock. This clock is generated by the timing recovery circuit of the data storage device. This clock signal allows the edges of the data output by the data storage device 12 to be synchronized with the logic circuitry internal to the sync detect circuit 10. The sync detect circuit 10 is operable to control a data latch 20, which is operable to receive serial data from the line 14 and convert it to parallel data on a bus 22. The bus 22 is a byte-wide bus, such that the serial data input to the data latch 20 is converted into data words for output to a CPU 16. The sync detect circuit 10 must detect both the beginning of a sector output by the data storage device 12 and also determine the frame boundary. This will be described in more detail hereinbelow.

Figure 2:
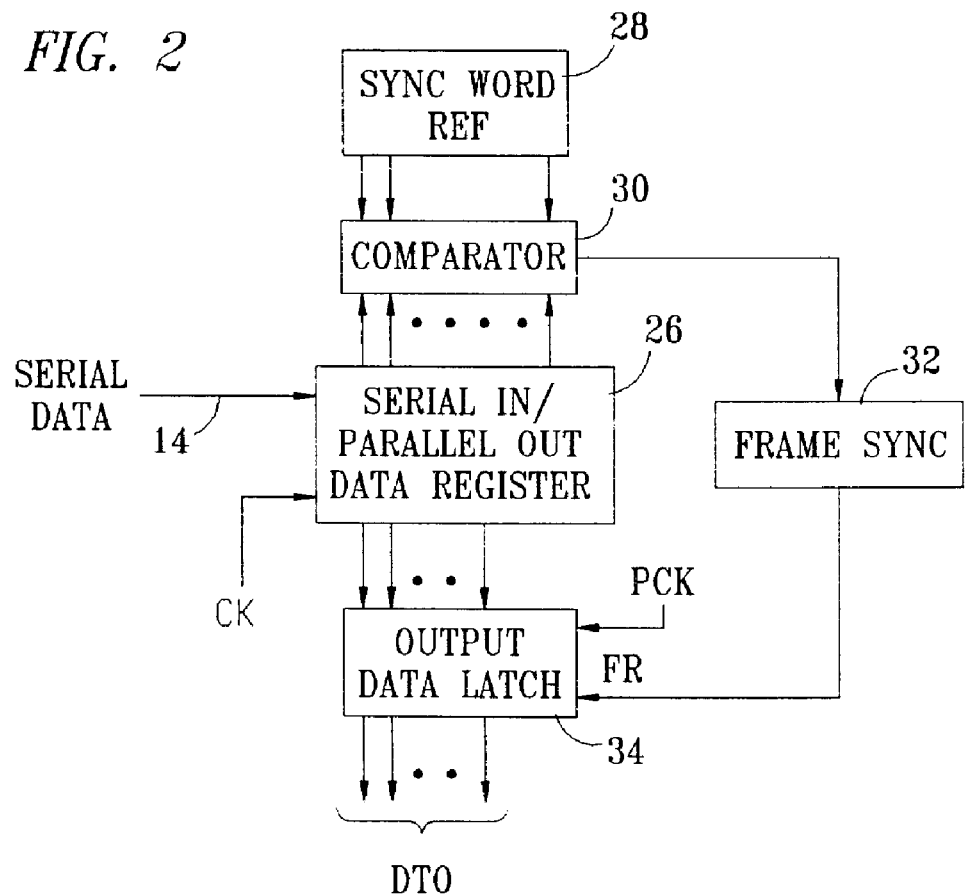
FIG. 2 illustrates a block diagram of the sync detect circuit.

Referring now to FIG. 2, there is illustrated a block diagram of the sync detect circuit 10 and a latch 20. The serial data is received on a line 14 and input to a serial in/parallel out data register 26. The data continually passes through the data register 26 with the data register 26 having, in the preferred embodiment, eighteen registers to allow for storage of two nine-bit words. Therefore, there will be eighteen sequential data bits stored in the data register 26 on any given cycle of the clock CK. An internal register 28 is provided for storing a reference sync word. Each bit in the data register 26 is compared with each bit in the reference sync word in register 28 with a comparator 30. When a true comparison is made, this indicates that the sync word is present in the data register 26. When this occurs, this represents a word boundary or a frame boundary. This is input to a frame sync circuit 32. The frame sync circuit 32 generates a frame sync signal FR, which is input to an output data latch 34. The output data latch 34 is operable to extract a single data word, which is nine bits in length, for storage therein and output as a data output word DTO, and is clocked by the system clock PCK.

Figure 3:
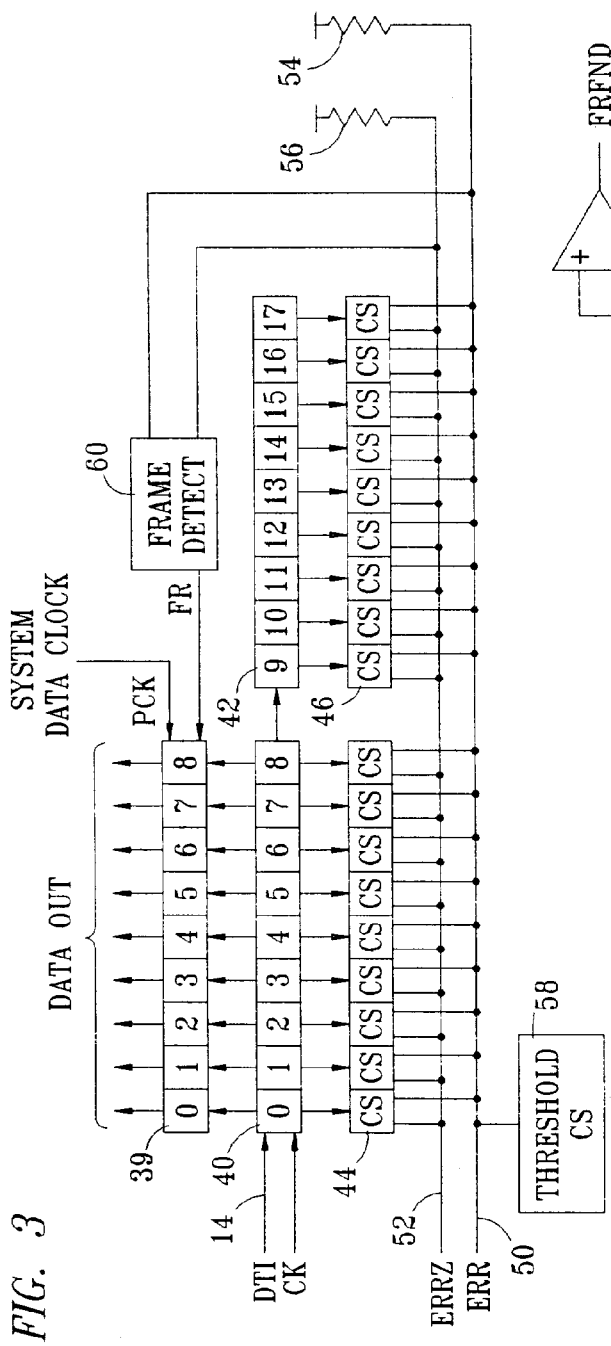
FIG. 3 illustrates a more detailed block diagram of the sync detect circuit of the present invention.

Referring now to FIG. 3, there is illustrated a more detailed logic diagram of the sync detect circuit of FIG. 2. The serial in/parallel out data register is comprised of two 8-bit master/slave serial data registers 40 and 42. The data register 40 has the output thereof input to the input of the serial data register 42. The bits in the serial register 40 are labeled "0" through "7" and the registers in the serial data register 42 are labeled "8" through "17". The output of each register in the serial data register 40 are input to a bank of current sources 44, there being a separate current source for each register or data bit stored in the serial register 40. Similarly, the output of each of the registers in the serial data register 42 are input to a bank of current sources 46, with a separate current source for each of the registers in the serial data register 42 and the associated bit stored therein.

Redirection of each of the current sources is metal-mask programmed, such that the current output thereby will be a function of the logic state match stored in the associated data register in the serial data registers 40 and 42. Therefore, the digital domain is converted into the analog current domain. Further, this is a differential current domain provided by two differential lines, one line 50 labeled "ERR" and one line 52 labeled "ERRZ". These current sources in current source banks 44 and 46 will sink current from the lines 50 or 52, which lines 50 and 52 are connected through resistors 54 and 56 to a positive supply voltage rail. Redirection of the current sources can be controlled also through an XOR gate used as logic compensation between the logic state Q and register stored sync pattern.

The coding scheme utilized is to have each current source sink current from one of the lines 50 and 52 at a level of $I_0$. There will be provided a programming scheme which is a metal-mask programmable scheme that will sink the current $I_0$ from the line 50 in the presence of a bit mismatch and will sink current from the line 52 in the presence of a bit match. Thereafter, it is only necessary to compare these two current levels on the lines 50 and 52 to each other in order to determine if there is an error therebetween. In order to provide some fault tolerance for a selected number of bits that can be in error, there is an offset provided. This offset essentially allows a number of mismatches to occur between the mask-programmed sync reference word and the received word. For example, if there were three bits that resulted in current being sinked from the wrong one of the lines 50 and 52, the error would be $6I_0$, since for each bit and error, there would be $I_0$ less current in the correct one of the line and $I_0$ more current in the wrong line 50 or 52. To accommodate for this, there is a threshold current provided by a threshold current source 58 which effectively sinks an additional amount of current from the line 50. This would effectively replace a predetermined number of bits that are in error.

The data latch 34 is comprised of a 9-bit latch that has the input thereof connected to the output of each of the registers in the serial data register 40. Each of the latches in the latch 34 are master/slave latches with the master latch clocked by the frame sync signal FR and the slave portion thereof clocked by the system byte clock PCK, this allowing the data to be extracted by the system and synchronized therewith independent of the frame sync that is defined by the sync detect circuit 10. In order to generate the frame detect signal, the signals on the lines 50 and 52 are input to a frame detect block 60, that is operable to determine if there is a sync word detected and then determine when to generate a frame clock signal. This will be described in more detail hereinbelow.

Figure 4:
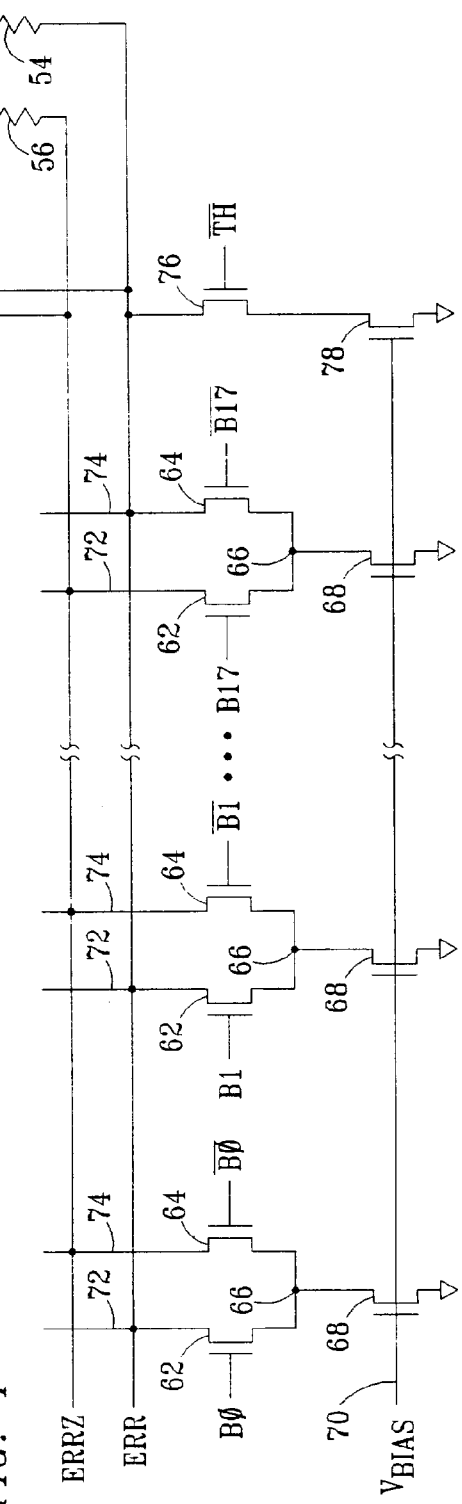
FIG. 4 illustrates a schematic diagram of the current sources that comprise the sync detect circuit.

Referring now to FIG. 4, there is illustrated a detailed block diagram of the current source block 44 and the current source block 46. Each of the current switches in the current source block 44 and the current source block 46 are comprised of two N-channel transistors 62 and 64. The sources of each of the transistors 62 and 64 are connected to a common source node 66. The common source node 66 for each of the pairs of transistors 62 and 64 are connected to the drain of an associated N-channel current source transistor 68, the source thereof connected to ground and the gate thereof connected to a bias voltage on a line 70. The gate of transistor 62 is connected to the true output of the register associated with that pair of transistors and the gate of transistor 64 is connected to the inverted output of the register associated with the pair of transistors 62 and 64.

The drains of the switching transistors 62 and 64 for each of the pairs are connected to lines 72 and 74. The lines 72 and 74 are masked-programmable to be connected to either of the lines 50 or 52, such that both are connectable to the same line for each pair of transistors 62 and 64. In this manner, the pair of transistors 62 and 64 for each of the bits B0–B17 can be programmed to draw current from only one of the lines 50 and 52 for a logic match and the other of the lines for a logic mismatch. For example, in the example illustrated in FIG. 4, the pairs of transistors 62 and 64 are illustrated for the bits B0, B1 and B17. The programming is such that the line 72 associated with the drain of transistor 62 for the bit B0 is connected to the line 50, whereas the drain of the transistor 64 associated with the B0 bit is connected to line 52. Similarly, the line 72 associated with the drain of transistor 62 for the bit B1 is connected to line 50 and the line 74 associated with the drain of transistor 64 for the B1 bit is connected to the line 52 The pair of transistors 62 and 64 for the B17 bit are connected opposite to those associated with the B0 and B1 bit. The line 72 associated with the drain of transistor 62 is connected to the line 52 and the line 74 associated with the drain of transistor 64 is connected to the line 50. Therefore, when a logic "1" is present on registers B0 and B1, current will be sinked from line 50, whereas a logic "1" for bit B17 will result in current being sinked from line 52.

The threshold current source 58 is illustrated with a single current switch in the form of an N-channel transistor 76, connected in series with an N-channel current source transistor 78. Transistor 76 has the drain thereof connected to the ERR line 50 and the source thereof connected to the drain of transistor 78. Transistor 78 has the source thereof connected to ground and the gate thereof connected to the $V_{BIAS}$ voltage on the node 70. The gate of transistor 76 is connected to a threshold signal TH. Whenever the threshold signal TH is present, a current source in the form of transistor 78 will sink a predetermined level of current from the ERR line 50. The size of transistors 68 are all the same with the transistor 78 being sized to determine the level of current that is sinked thereby.

The lines 72 and 74 are connected to the ERRZ line 52 and the ERR line 50 such that the logic state of each of the output registers in the data registers 40 and 42 will result in the associate current source transistors 68 having their drains connected to the ERRZ line 52. For an eighteen-bit sync word, this will result in a current of $18I_0$ being sinked from the line 52. This will result in a voltage drop across the resistor 56. Of course, this assumes no errors in the sync word and also that the sync word is loaded in the registers 40 and 42, which will only exist for a single clock cycle. In order to provide an appropriate offset, the threshold current source must provide at most a matching current level of $17I_0$ on the line 50 to provide a voltage drop across the resistor 54 corresponding to the voltage drop across the resistor 56. To account for errors, this level is lower, as will be described herein below.

The voltage on the lines 50 and 52 are input to a comparator 80, the positive input of comparator 80 connected to the line 52 and the negative input of the comparator 80 connected to the line 50. The output of comparator 80 comprises a Frame Find signal FRFND. This comparator 80 compares the voltage of the two lines 50 and 52, and whenever they go below a "0" value, the output will go high.

The conversion of the digital word to a differential analog current mode logic domain provides for significantly less circuitry than a true digital approach. By comparison, a 2-byte fully-digital fault-tolerant sync detector is prohibitively expensive in terms of the required number of logic gates. Further, the differential approach provides a number of advantages. The advantages provided by this differential approach are:

1. The current change on each line 50 and 52 is equal to the negative current change on the other line. This will reduce noise. In addition, if the ERR line 50 and the ERRZ line 52 are laid out in parallel and close to each other, they will form a dipole. This will greatly reduce electromagnetic noise and capacitive coupling to/from other signals.

2. In the neighborhood of the worst-case sync detection operation, where the actual number of bit mismatches equals or is one greater than the threshold, the voltage potential of the error of the ERR line 50 and the ERRZ line 52 will be approximately a single voltage apart ($V_0=I_0*R$). This small amount of voltage difference will ensure that all current switches and current sources will operate at approximately the same potential, thus greatly reducing effects of non-ideal device characteristics. This eliminates the need for more elaborate current sources, such as cascode current sources. In addition, the current switches can be realized as minimum size source-connected MOS transistors.

3. The number of additional current sources required to re-balance the current lines is a simple linear integer function of the threshold.

4. A simple and regular metal mask via pattern that connects two metal layers is all that is required to establish a new sync field bit pattern.

5. The differential approach is twice as insensitive to device mismatch errors as the single-ended approach.

In order to determine the number of current sources and the size thereof required for the threshold current source 58, the following derivation is set forth.

Derivation of Differential Current-mode Equation

Let,
N=18, observation window size, i.e., size of the serial shift register equal to the sync field length
n=actual number of instantaneous bit errors, $0 \leq n \leq N$
t=set threshold value, i.e., tolerated number of bit errors; for three bits: $0 \leq k \leq 7$
k=additional number of current sources connected to the non-error line that are not switched dynamically
$I_0$=unit current source
$V_0$=voltage drop contribution of the register bit, $V_0-I_0*R$
The error current is directly proportional to the instantaneous number of bit errors and the number of additional static sources:

$$I_E=(n+k)I_0$$

The non-error current is directly proportional to the instantaneous number of correct bits:

$$I_N=(N-n)I_0$$

Both currents are converted into voltage through a pair of matched resistors:

$$V_E=(n+k)I_0R=(n+k)V_0$$

$$V_N-(N-n)I_0R=(N-n)V_0$$

and their difference is being input to a comparator $$\Delta V=V_N-V_E-(N-2n-k)V_0$$

As long as $\Delta V$ is less than zero the sync search continues. It stops when $\Delta V$ is greater than zero and the sync found condition is then declared.

Derivation of k

Sync found if $\Delta V \geq 0$ $$N-2n-k \geq 0 == \geq k \geq N-2n$$

Since k is an integer, the boundary value of k that satisfies this equation is $$k \leq (N-1)-2n$$

For the number of bit errors equal to the threshold t, $$k=(N-1)-2t \text{ or,}$$

$$k=(2*2^B+p)-2t$$

$$k=2*(2^B-y)+p=2*t+p$$

such that, $$N-1=2*2^B+p \text{ and,}$$

t=one's complement of t in B digit binary representation. For example, for N=18, t=[$t_2,t_1,t_0$]
t̄=[$\bar{t}_2,\bar{t}_1,\bar{t}_0$] (bit-by-bit inversion) and $$k=2t+3$$

The comparator input as a dynamic function of the number of bit errors, $$\Delta V=[1+2(t-n)]V_0$$

Because the current sources are simply redirected from one line to the other during the search process, the minimum differential voltage distance is $2V_0$. Moreover, $\Delta V=0$ is not a valid solution of the above equation. It reveals that the comparator threshold should be set to zero to decide between $\Delta V=V_0$ (found if n=t) and $\Delta V=-V_0$ (not found if n=t+1).

Figure 5:
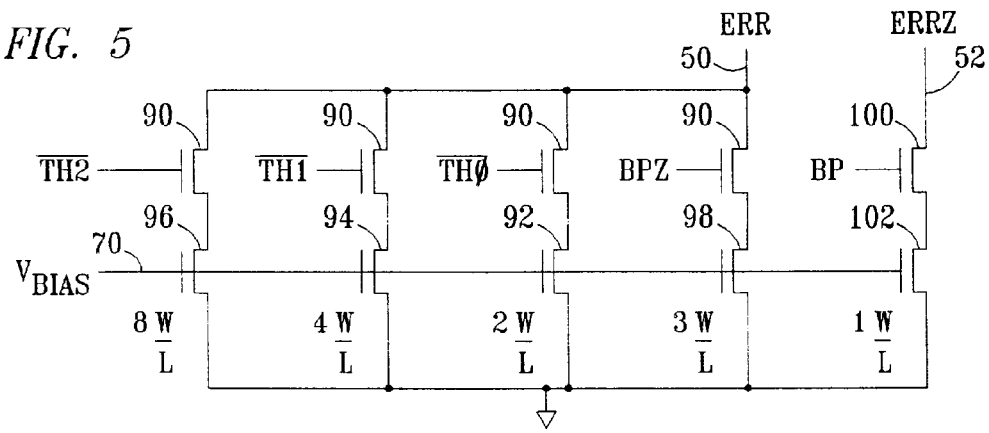
FIG. 5 illustrates a schematic diagram of the threshold portion of the current sources.

Referring now to FIG. 5, there is illustrated a schematic diagram of the threshold current source 58. The threshold current source 58 is comprised of four current sources for sinking current from the ERR line 50. There are provided four current switching transistors 90, having the drains thereof connected to the ERR line 50 and the sources thereof connected to an associated current source. The gates of the four transistors are connected to signals BPZ, TH0, TH1 and TH2. The BPZ signal is a bypass mode signal and will not be considered. The threshold signals TH0-Bar, TH1-Bar and TH2-Bar are all the complement value. The transistor 90 associated with the signal TH0-Bar is connected to the drain of an N-channel transistor 92, the source thereof connected to ground and the gate thereof connected to the bias voltage line 90. The transistor 90 associated with the threshold gate control signal TH1-Bar has the source thereof connected to the drain of an N-channel transistor 94 with the source of transistor 94 connected to ground and the gate thereof connected to the bias voltage line 70. The source of the transistor 90 associated with the TH2-Bar gate control signal is connected to the drain of an N-channel transistor 96 having the source thereof connected to ground and the gate thereof connected to the bias voltage line 70. The transistors 92, 94 and 96 are sized in integer multiples or are interdigitated of the transistors 68. Each of the transistors 68 will be considered to have a reference size of W/L representing the width-to-length ratio. The transistor 92 is a factor of two greater than the transistor 68, the transistor 94 is a factor of four greater, and the transistor 96 is a factor of 8 greater. Therefore, transistor 92 will have a current therethrough of $2I_0$, transistor 94 will have a current therethrough of $4I_0$ and the transistor 96 will have a current therethrough of $8I_0$, $I_0$ being the current through each of the transistors 68.

The transistor 90 associated with the BPZ gate control signal has the source thereof connected to the drain of an N-channel transistor 98, the source thereof connected to ground and the gate thereof connected to the bias signal 70. Transistor 98 has a size relationship that is three times the size of the transistor 68. An additional bypass transistor 100 is provided having the drain thereof connected to the ERRZ line 52, the source thereof connected to the drain of an N-channel transistor 102 and the gate thereof connected to a bypass signal BP. Transistor 102 is similar in size to the transistor 68 and has the source thereof connected to ground and the gate thereof connected to the bias control signal 70 and constitutes a current source. The transistor 90 is turned on during normal operation, the 9-bit mode, and turned off turning the bypass 8-bit mode. In this mode, the transistor 100 will be turned on. As such, when transistor 100 is turned on and transistor 90 is turned off, this will result in a negative difference of $-I_0$ as compared to the normal operating mode.

Figure 6:
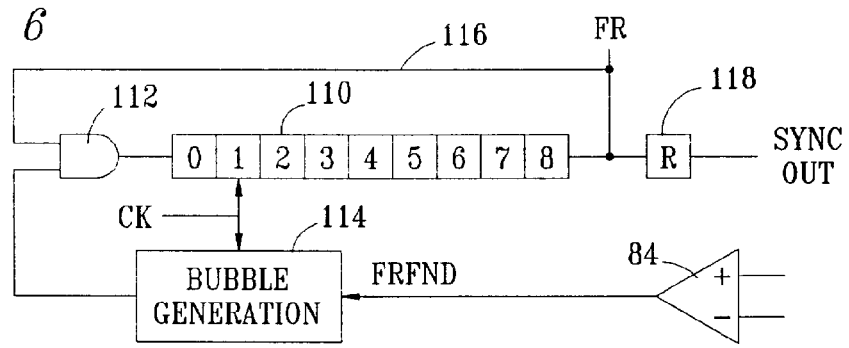
FIG. 6 illustrates a block diagram of the frame boundary detect circuit.

Referring now to FIG. 6, there is illustrated a diagrammatic view of the frame detect circuit 60 of FIG. 3. The frame detect circuit 60 is comprised of a 9-bit circular register 110. The circular register 110 has an input register and an output register, the input register labeled "0" and the output register labeled "8". The input register is connected to the output of an AND gate 112 which has one input thereof connected to the output of a bubble generation block 114 and the other input thereof connected to the output of the output register labeled "8" on a line 116. The bubble generation block 114 is operable, in response to generation of the frame find signal FRFND to place a zero in the input register labeled "0" in the circular register 110. In the absence of the FRFND signal, the output of the bubble generation block 114 is raised high, such that the output of the register labeled "8" is input to the input register labeled "0". This allows a logic "0" to be continuously inserted into only one bit of the register 110 as it is clocked by the CK signal. Whenever a "0" is output from the output register labeled "8", this will constitute a frame border. It is noted that whenever the sync word is detected, the next eight bits must be loaded into the register 40 for the data is to be latched into the latch 34. Therefore, the frame border must be delayed by nine clock cycles before generating the FR signal. When this is generated, the output of register 40 is then latched, this output constituting the next data word following the sync word. The bubble generation block 114 therefore merely generates a low logic level on the input to the AND gate 112 for a single clock cycle to ensure that a logic "low" is loaded into the register 110 on the input thereof. The output of the register 110 on the register labeled "8" is also input to a register block 118 to provide a sync output signal that is delayed and stored.

Figure 7:
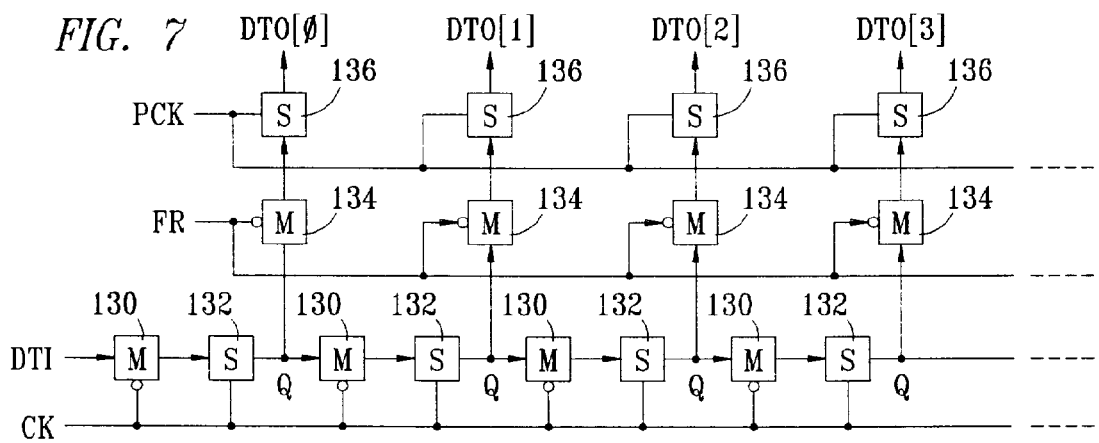
FIG. 7 illustrates a block diagram of the data out serial/parallel conversion circuit.

Referring now to FIG. 7, there is illustrated a more detailed block diagram of the serial data register 40 and 42 and the data latch 34. Each of the registers in the serial data register 40 and the serial data register 42 are comprised of a master/slave combination. There is provided a master latch 130 having the input connected to the serial data input, which for the first register will be the DTI input and for subsequent registers will be the output of the previous register. The output of the master latch 130 is input to the input of a slave latch 132. The output of slave latch 132 is connected to the input of the next master latch 130. The master latch 130 is clocked by the inverse of the clock signal CK and the slave latch 1302 is clocked by the CK signal. Therefore, whenever the clock signal is low, the master latch will latch data on the output thereof and, whenever the clock signal goes high, the slave latch 132 will clock the data to the output thereof. This output is labeled "Q".

The data latch 34 is also a master/slave configuration with each data register therein comprised of a master latch 134 and a slave latch 136. The master latch 134 has the input thereof connected to the output of the associated slave latch 132 in the serial data register 40. The output of the master latch 134 is connected to the input of the associated one of the latches 136 in the data latch 34. The master latches 134 are clocked by the frame sync signal FR and the slave latches 136 are clocked by the PCK system word clock. The master latches 134 are clocked such that they will latch data therethrough on a low logic level of the FR signal, whereas a high logic level is required for the PCK signal. By providing the master/slave relationship with the latches 134 and 136 in the data latch 34, the internal frame sync signal FR allows the data to be loaded into the master latches 134 with an internal frame signal associated with the sync detect circuit 10, whereas the system sync clock signal PCK allows data to be output therefrom in synchronization with the word rate of the system. It is noted that the master latch 134 loads on the "low" logic level of the CK signal, whereas the PCK signal transfers data on the "high" level of the CK signal. Therefore, the master/slave latches 134 and 136 will not be "transparent." Additionally, since there is a separate internal frame sync signal, it is not necessary to align the system word clock PCK with the internal frame sync signal FR.

Figure 8:
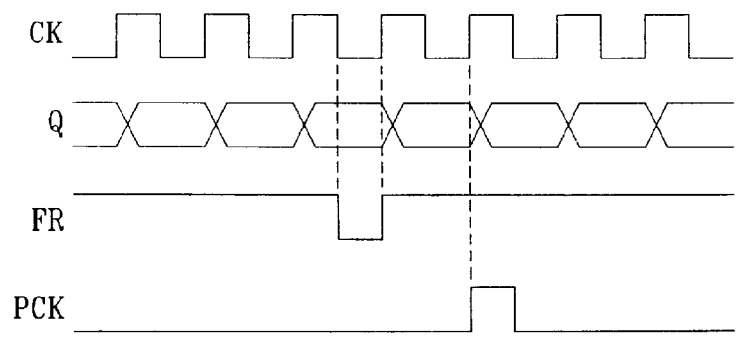
FIG. 8 illustrates a timing diagram for the overall operation of the system.

Referring now to FIG. 8, there is illustrated a timing diagram for the clock signals CK and the system word clock PCK. The data output of each of the slave latches 132 is labeled as "Q". This illustrates the operation of the structure of FIG. 7.

Each of the shift register cells in both the serial register 40 and the data latch 34 is a relatively straight forward level-sensitive D-type latch. The master latch 130 operates with a simple reset operation. Each of the master latches 130 and 134 have a power-down mode of operation. During this power down-mode, the clock inputs are set such that the latches enter the state wherein the output of each of the master latches will be a logic "1", the clock input to the master latches 134 is forced to an inactive state of a logic "1" and the PCK clock is forced to an inactive state of a logic "0". This will force a logic "1" output on the output of each of the slave latches 132 and logic "1" output on each of the slave latches 136. This effectively renders the master latches 130 and 134 "opaque", i.e., they do not allow data to be transmitted therethrough. They merely force the output to be a logic "1". The slave latches 132 and 136, on the other hand, are transparent and pass the forced output of the master latches 130 and 134, respectively, therethrough. In this manner, reset circuitry is needed only in master latches and not in the slave latches.

In another power-down operation, the register 42 will be powered down after detection of the sync word. This is due to the fact that it is no longer needed.

In summary, there has been provided the sync detect circuit that is operable to detect the presence of a sync word in a serial data string by converting the digital word to a parallel word in the current domain. In the current domain, currents are added to a first line in the presence of a logic bit match value and to a second line in the presence of a logic bit mismatch value. These currents are added for each bit in the sync word and then the two values compared with each other. When the value falls below a predetermined reference, this indicates the presence of a sync detect word. This event then triggers the generation of a frame boundary for a word. This frame boundary is then utilized to latch the next and following data word in a latch and then output it to the system.

Although the preferred embodiment has been described in detail, it should be understood that various changes, substitutions and alterations can be made therein without departing from the spirit and scope of the invention as defined by the appended claims.

What is claimed is:

1. A sync detect circuit for detecting the presence of a series of sync bits in a predetermined order of n data bits in length in a serial digital data stream and clocked with a bit clock, comprising:
    a serial data register for receiving the data bits from the serial data stream and having a length at least n, said serial data register clocked by the bit clock;
    a parallel current domain converter for converting each of n sequential bits into the current domain such that a discrete current value is output for each of the n bits in said serial data register, the value thereof corresponding to the bit mismatch digital value of the associated serial bit;
    a summing circuit for summing the discrete current values associated with all of the converted n bits stored in said serial data register to provide a summed value;
    a comparator for comparing the summed value with a reference sum value; and
    a sync detect signal generator for generating a sync detect signal when said comparator provides a threshold comparison of the summed value with said reference sum value.

2. The sync detect circuit of claim 1, wherein said parallel current domain converter is operable to convert each of the n sequential match/mismatch bits stored in the serial data register into a differential current domain.

3. The sync detect circuit of claim 2, wherein said parallel current domain converter comprises:
    a first differential node and a second differential node;
    a plurality of switchable current sources associated with said first and second differential nodes, each of said switchable current sources associated with one of the n sequential bits in said serial data register and switchable to said first differential node when the associated one of the n bits matches said corresponding one of said n sync bits and switchable to said second differential node when the associated one of the n bits is mismatched with the corresponding one of said n sync bits;
    said summing circuit comprising said first and second differential nodes for summing the switched current thereto by said switchable current sources, respectively; and
    wherein said comparator is operable to determine the difference between said summed current on said first and second differential nodes and compare said difference with a predetermined reference.

4. The sync detect circuit of claim 1, wherein said serial data register has a length of n.

5. The sync detect circuit of claim 1, wherein the sync bits are arranged in an order that represents a discrete multiple of a system data word associated with the data received in the serial data register.

6. The sync detect circuit of claim 5, wherein the series of sync bits comprises two data words in length.

7. The sync detect circuit of claim 1, and further comprising a frame boundary detect circuit for generating a frame sync signal upon generation of said sync detect signal, such that the presence of said sync detect signal indicates the presence of a frame boundary associated with the beginning of a data word that is to be received in the next sequential number of bits received in the serial data register after detection of said sync detect signal and wherein said n sequential bits are the last n bits stored in said serial data register.

8. The sync detect circuit of claim 7, and further comprising a parallel data register for receiving the output of the first m-bits of said serial data register, m being the length of a data word in the serial data stream, said parallel data register loaded by said frame sync signal.

9. The sync detect circuit of claim 8, wherein said frame detect circuit comprises a delay for delaying the generation of said frame sync signal by m clock cycles of the bit clock, such that the next m bits can be loaded into the serial data register prior to loading into said serial data register.

10. The sync detect circuit of claim 9, wherein said frame detect circuit comprises a circular m-bit register having first logic signals stored therein and clocked by the bit clock such that the values passed therethrough are recirculated and an insertion circuit for inserting a logic signal of a second logic state into the first of the registers in said circular register with the mth register being the output register for outputting said frame detect signal whenever said mth register is at the second logic state.

11. A method for detecting the presence of a series of sync bits in a predetermined order of n data bits in length in a serial digital data stream and clocked with a bit clock, comprising the steps of:

- receiving in a serial data register the data bits from the serial data stream and having a length at least n, and clocking the serial data register clocked with the bit clock;
- converting each of n sequential bits into the current domain with a parallel current domain converter such that a discrete current value is output for each of the n bits in the serial data register, the value thereof corresponding to the bit mismatch digital value of the associated serial bit;
- summing the discrete current values associated with all of the converted n bits stored in said serial data register with a summing circuit to provide a summed value;
- comparing the summed value with a reference sum value with a comparator; and
- generating a sync detect signal when the step of comparing provides a threshold comparison of the summed value with the reference sum value.

* * * * *